Z. J. ANDERSON.
ANIMAL-TRAP.

No. 185,659. Patented Dec. 26, 1876.

WITNESSES:
Francis McArdle,
John Goethals.

INVENTOR:
Z. J. Anderson
By Munn & Co
ATTORNEYS.

UNITED STATES PATENT OFFICE.

ZACHARIAH J. ANDERSON, OF DALLAS, TEXAS.

IMPROVEMENT IN ANIMAL-TRAPS.

Specification forming part of Letters Patent No. 185,659, dated December 26, 1876; application filed September 16, 1876.

*To all whom it may concern:*

Figure 1:
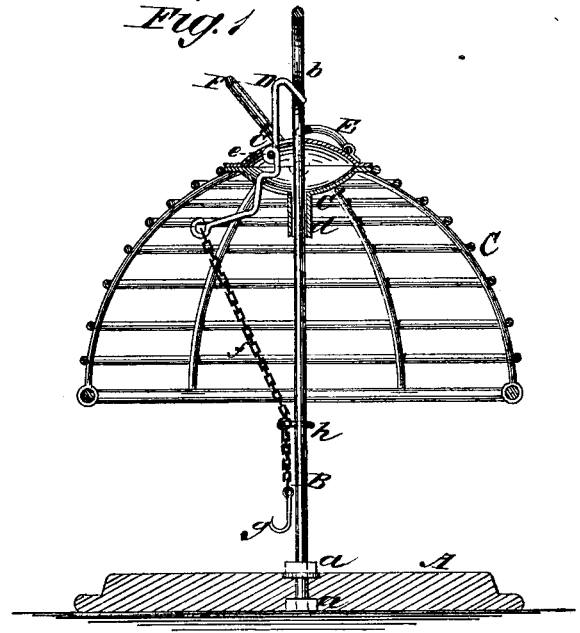
Figure 2:
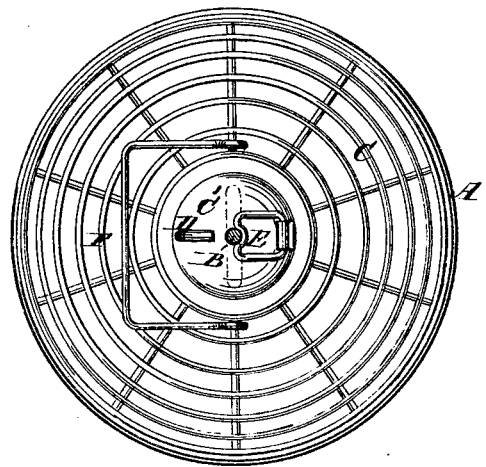

Be it known that I, ZACHARIAH J. ANDERSON, of Dallas, county of Dallas, and State of Texas, have invented a new and Improved Animal-Trap, of which the following is a specification:

In the accompanying drawing, Figure 1 is a central vertical section, and Fig. 2 is a top view, of my improved animal-trap.

Similar letters of reference indicate corresponding parts.

My invention consists in the combination of a hemispherical cage, a central standard, and a base-piece, so arranged that the cage may slide on the standard, and may be held at the top of the standard by a trigger that engages with a ring at the top of the standard. The trigger is tripped by a chain to which bait is attached.

In the drawing, A is the circular base-piece of the trap, which may be made of any suitable material. It is rabbeted at its edge to receive the upper portion of the trap, and is bored centrally to receive a standard, B, which is secured thereon by the nuts $a$ $a$, that are secured on the rod, and clamp the base-piece. An eye, $b$, is formed at the upper end of the rod, for convenience in handling, and also for receiving the trigger that supports the cover or cage. C is a hemispherical cover or cage, made of wire, and provided with a cap or top piece of sheet metal, which consists of two concave pieces, $C'$, attached to the top of the cage, having their concave surfaces placed together, and each provided with a central aperture that fits loosely on the standard B. $d$ is a short section of tube attached to the lower piece $c$, forming an additional guide for the cage. D is a trigger that is pivoted at $e$, and is capable of hooking into the eye $b$. The lower end of the trigger is bent to form nearly a right angle with the upper part, and is connected to a chain, $f$, that is provided with a bait-hook, $g$, and also with a guiding-ring, $h$, that slides on the standard, B. E is a dog, jointed to the top piece $C'$, and is capable of clamping the standard, so that the cage cannot be raised without first turning the dog back. F is a handle for raising the cage.

The trigger D, when the trap is set, hooks into the eye $b$. Any attempt to remove the bait from the hook $g$ trips the trigger, allowing the cage to fall upon the base-piece. The dog E prevents the imprisoned animal from raising the cage.

The advantages claimed for this invention are, that there is a free, unobstructed space on all sides of the bait. It is simple and inexpensive in its construction; it can be easily set, and conveniently chained. It can be packed in small compass for shipping, as the tops or cages can be detached and packed in nests, when the other parts may be placed closely together.

Having described my invention, what I claim as new, and desire to secure by Letters Patent, is—

1. The combination of the base A, the standard B, cage C, trigger D, chain $f$, and clamp E, substantially as herein shown and described.

2. The crooked lever D, fulcrumed at $e$, in combination with the ring $b$ and bait-chain $f$ $g$, as and for the purpose described.

3. The dog E, in combination with the top piece $C'$ and standard B, substantially as and for the purpose specified.

ZACHARIAH J. ANDERSON.

Witnesses:
K. M. VAN ZANDT,
THOS. A. TIDBALL.